United States Patent [19]

Ritz et al.

[11] 4,289,866

[45] Sep. 15, 1981

[54] PROCESS FOR THE PREPARATION OF COPOLYMERS

[75] Inventors: Jürgen Ritz, Mainz; Hermann Hotze; Hans-Dieter Mummenthey, both of Wiesbaden, all of Fed. Rep. of Germany

[73] Assignee: Hoechst Aktiengesellschaft, Frankfurt am Main, Fed. Rep. of Germany

[21] Appl. No.: 124,378

[22] Filed: Feb. 25, 1980

[30] Foreign Application Priority Data

Mar. 1, 1979 [DE] Fed. Rep. of Germany ....... 2907997

[51] Int. Cl.$^3$ .................... C08F 222/20; C08G 83/00
[52] U.S. Cl. ................... 526/320; 428/500; 525/227; 525/328; 525/377; 525/386; 525/397; 526/75; 526/321; 526/324; 526/325; 560/200
[58] Field of Search .............. 526/320, 321, 324, 325, 526/75; 560/200; 525/227, 328, 377, 386, 397

[56] References Cited

U.S. PATENT DOCUMENTS

| | | | |
|---|---|---|---|
| 3,221,043 | 11/1965 | Fekete et al. | 526/320 |
| 3,270,088 | 8/1966 | Hicks | 526/320 |
| 3,367,992 | 2/1968 | Bearden | 526/320 |
| 3,406,221 | 10/1968 | Wright et al. | 526/320 |
| 3,414,635 | 12/1968 | Edwards et al. | 526/320 |
| 4,166,893 | 9/1979 | Kambanis et al. | 526/320 |

*Primary Examiner*—John Kight, III
*Attorney, Agent, or Firm*—Hammond & Littell, Weissenberger and Muserlian

[57] ABSTRACT

A process for the preparation of copolymers in which in a first step an olefinically unsaturated dicarboxylic acid is reacted with a polyhydric alcohol to yield a hemi-ester having free hydroxyl groups, which in a second step is reacted with a monoepoxy compound to yield an olefinically unsaturated diester containing hydroxyl groups, wherein the diester is copolymerized in at least one further step with at least one unsaturated monomer having no free carboxyl groups, and the hardenable reaction product thus obtained is either isolated or hardened with a hardening agent, and coating and adhesive compositions containing a copolymer thus obtained.

10 Claims, No Drawings

PROCESS FOR THE PREPARATION OF COPOLYMERS

The preparation of thermosetting binding agents by radical copolymerisation of styrenes, alkylates and hydroxyalkylates of acrylic and/or methacrylic acid together with maleic acid hemi-esters of $C_{4-8}$ alcohols or the reaction products of these hemi-esters with a monoglycidyl compound is known. The only maleic acid hemi-esters which have been described for this purpose are those of isobutyl or ethylhexyl alcohol, that is monohydric alcohols. Consequently, these hemi-esters have no free hydroxyl groups. The products thus prepared can be hardened by the addition of polyisocyanates or amine resins at elevated temperatures. These binding agents may be employed in the preparation of coverings, coatings or the like.

The reaction of an unsaturated dicarboxylic acid, for example maleic acid, with a polyhydric alcohol, for example a diol or triol, and in a second step the further reaction of the intermediate product with an epoxide compound in the form of a glycidyl ester, glycidyl ether or alkylene oxide is also known. The low-molecular compounds obtained in the second step can be hardened after mixing with an amine resin at elevated temperture, for example for 30 minutes at 120° to 180° C., and thus processed to give coatings.

In the case of the first above-mentioned process, cross-linking of the known products at room temperature is not possible owing to the too small proportion of reactive groups; and in the case of the second-mentioned process, cross-linking is not possible due to the too low molecular weight of the products to be hardened. Both processes therefore provide only thermosetting. For this reason, the applicability of these known binding agents is restricted. It is therefore desired to extend the range of applicability of such binding agents for coatings.

The present invention provides a process for the preparation of copolymers, whereby in a first step an olefinically unsaturated dicarboxylic acid is reacted with a polyhydric alcohol to yield a hemiester having free hydroxyl groups, which in a second step is reacted with a monoepoxide compound to yield an olefinically unsaturated diester having hydroxyl groups, said process being characterized in that the diester is copolymerised in at least one further step with at least one unsaturated monomer containing no free carboxyl groups and the hardenable reaction product thus obtained is isolated or is hardened with a hardening (curing) agent.

The invention affords the possibility of hardening the products either at room temperature or at an elevated temperature and of obtaining, in so doing, films and coatings with improved physical and chemical properties. The possible applications of these copolymers is therefore substantially extended when they are used as binding agents.

The preparation of the hemi-ester in the first step of the process of the invention is effected in a conventional way. The reaction of the hemi-ester in the second step is conveniently effected at a temperature of 100 to 170, preferably 120° to 155° C., and generally with an equivalent quantity of the monoepoxide compound, since the reaction thereby proceeds especially smoothly, whereby the epoxide groups are opened to form an ester group—and optionally to a small extent an ether group—and free hydroxyl groups. In this way, there is obtained a mixed ester of the dicarboxylic acid originally used, one ester group of which has free hydroxyl groups from the polyhydric alcohol component and the other ester group of which has free hydroxyl groups from the epoxide component. These free hydroxyl groups play a substantial part in the subsequent hardening of the copolymer.

The molecular weight and consequently the viscosity of the final products may be controlled, depending on the desired properties of the intermediate products. Thus, it is possible to obtain monomeric and also oligomeric polymerisable intermediate products by selecting a suitable equivalent proportion of the hydroxyl groups of the starting alcohol to the carboxyl groups of the starting acid. The molecular weight of the copolymerisable intermediate products generally lies in the range from 250 to 1,500, preferably 400 to 1,250. The OH number of these intermediate products generally lies in the range from 175 to 550, preferably between 280 and 450.

The copolymerisation of the intermediate products can be effected in one or more, and preferably in two steps, generally at a temperature of 80 to 220, preferably 130 to 170, especially 140° to 160° C., whereby the use of solvents can optionally be omitted. The copolymerisation can be effected thermally. However, the reaction is preferably carried out in the presence of catalysts, especially free radical catalysts, and most preferably peroxides, such as, for example di-tert.-butyl-peroxide, di-benzoyl-peroxide, di-cumyl-hydroperoxide, or azo compounds such as azo-bis-isobutyronitrile or the like. In so doing, the presence of suitable solvents or diluting agents is appropriate into which the reactants may be incorporated in the course of reaction. Examples of such solvents include high-boiling aliphatic and/or aromatic solvents with a boiling point of 140° to 185° C., such as a mineral oil with a boiling point of 160° to 180° C., xylenes, ethylene glycol acetate monoethyl or monobutyl ether; and the like. The copolymerisation can also optionally be effected, for the control of molecular weight, in the presence of chain stoppers such as, for example, alkane thiols e.g. n-dodecyl-mercaptan.

The copolymerisable monomers can be present either individually or in admixture. If a monomer mixture is copolymerised with the intermediate product, a monomer mixture can be used in which generally at most 20, preferably at most 10% by weight, relative to the total monomer mixture, of hydroxyalkylate is present.

The copolymerisation is conveniently effected until a desired solids content of the copolymer of at least 60% by weight and, depending on the quantity of solvent used, generally not over 80, preferably not over 70% by weight, is obtained.

Copolymerisable monomers which may be used include, for example, aromatic vinyl compounds such as styrene, α-methyl-styrene, the various vinyl toluenes and divinyl benzenes (the last-mentioned are, however, generally used only in minor quantities); and alkyl acrylates or methacrylates with 1 to 6, preferably 1 to 4 carbon atoms in the alkyl radical or the corresponding hydroxyalkylates such as methyl, ethyl, n- or iso-propyl, n-, sec-, iso- or tert.-butyl, the various pentyl and hexyl acrylates or methacrylates, either individually or in admixture, and hydroxyalkyl esters with 2 to 4 carbon atoms such as hydroxyethyl and hydroxypropyl acrylate or methacrylate, likewise either individually or in admixture. If the copolymerisation is effected with a monomer mixture, this mixture conveniently contains at least 50 mol percent of aromatic vinyl compounds, preferably styrene.

Dicarboxylic acids which may be used for the preparation of the hemi-esters include, for example fumaric acid, itaconic acid, mesaconic acid, but preferably maleic acid and citraconic acid or their anhydrides, if these exist, either individually or in admixture.

Polyhydric alcohols which may be used include, for example, diols such as ethylene glycol, propane-1,2-diol, propane-1,3-diol, the various butane, pentane- and hexane-diols such as butane-1,4-diol, hexane-1,6-diol, neopentyl glycol, diethylene glycol or dipropylene glycol; and triols such as glycerol, trimethylolethane and -propane, pentaerythritol and dipentaerythritol. Furthermore, reaction products of such polyols with isocyanate compounds or carboxylic acids, for example pentaerythritol mono- or diesters with monocarboxylic acids, may also be used, as long as they contain at least two free hydroxyl groups per molecule.

Monoepoxides which may be employed in the reaction of the second step of the process of the invention include, for example, alkylene oxides such as ethylene oxide, propylene oxide, or styrene oxide; glycidol; glycidyl ethers of phenols, such as of phenol itself, of cresols or tert.-butyl phenol; and glycidyl esters of saturated carboxylic acids. The monoepoxide is preferably, however, selected from glycidyl esters of branched fatty acids of general formula

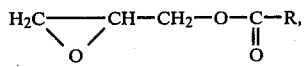

in which R represents the radical of a fatty acid branched in the α-position and having 8 to 16, preferably 10 to 12, carbon atoms.

The scope of the invention also includes the hardening of the copolymer obtained in the third or a further step, whereby the hardening can be effected in the presence of masked or free polyisocyanates, polycarboxylic acids (preferably in the form of anhydrides), amine resins or phenolic resins as hardening agents. Polyisocyanates which may be used for this purpose include, for example di- to tetrafunctional isocyanates such as toluylene diisocyanate, isophorone diisocyanate, hexamethylene diisocyanate, 2,4,6-triisocyanato-toluene, 4,4'4''-triisocyanato-triphenylmethane, 2,4,4'-triisocyanato-diphenylmethane, 2,2',5,5'-tetraisocyanato-diphenylmethane, and also trifunctional isocyanates which may be made, for example, by the addition of trimethylolpropane to toluylene diisocyanate, a triisocyanate which may be prepared by the reaction of hexamethylene diisocyanate and water or isocyanates with up to 4 free isocyanate groups, such as those prepared, for example by the reaction of toluylene diisocyanate and hexamethylene diisocyanate or their masked derivatives with, for example acetoacetates, for example of methanol, ethanol, propanols or butanols or ε-caprolactam. Polycarboxylic acids which may be used as hardening agents include, for example, maleic acid, succinic acid, adipic acid, phthalic acid, trimellitic acid, pyromellitic acid or anhydrides of these acids; and low-molecular weight oligomers or polyesters with free carboxyl groups. If desired, a catalyst may also be added, preferred catalysts being organometallic compounds such as, for example, dibutyl stannic dilaurate, dibutyl stannic oxide, and cobalt naphthanate or octoate, or amines such as, for example, ethylenediamine and its homologues such as diethylenetriamine, tetraethylenepentamine, tertiary amines such as triethylamine, tributylamine, dimethylaniline, and most preferably alkanolamines such as diethylethanolamine.

Surprisingly, the process according to the invention gives products which have properties which are at least as good as commercial products which have been prepared using over 20% by weight of hydroxyalkyl acrylates.

The hardening of the products obtained by the process of the invention, especially with polyisocyanates, may be effected at room temperature. At elevated temperatures, the others of the above-mentioned hardeners (including masked isocyanates) are generally employed, whereby the amine and phenolic resins can act, for example also in the presence of acids such as toluenesulphonic acid as hardener. In general, the thermosetting reaction proceeds within 10 to 30 minutes at 120° to 200° C. The addition of catalysts, for example metal compounds such as dibutyl stannic dilaurate and/or amines such as tertiary alkanolamines, e.g. diethylethanolamine are of particular interest in the use of isocyanates.

The hardenable binding agents may also be combined with pigments, fillers and/or additives conventional in the preparation of coating compositions.

When the products obtained according to the process of the invention have only a minor or even no proportion of hydroxyalkylates of unsaturated acids, hardened coatings may be obtained after hardening with suitable hardeners which are at least equivalent to the hitherto known coatings based on acrylate resins containing hydroxyalkylates, but generally they have surprisingly better coating properties. Due to the greater possibility of variation and selection of reaction materials in the preparation of the copolymers the present invention enables optimal coating compositions to be selected for the desired purpose.

Moreover, the solubility of the polymers is improved as a result of the incorporation of groups derived from unsaturated dicarboxylic acids such as maleic acid esters into the systems containing acrylates. Coating compositions containing solvents with a higher solids content than the hitherto known compositions based on acrylate resins can thereby be prepared, which are therefore environmentally safer systems.

The products obtained according to the invention may be used for paints and/or coatings for linings and casings for example also for corrosion protection for various objects, especially those exposed to atmospheric influences, such as buildings, vehicles and parts therefor, for example car bodies, for household appliances and electrical equipment and components thereof. They have a good adhesion to substrates of plastics and metals such as, for example, copper, brass, zinc and iron alloys. Moreover, they exhibit good flow properties when applied as coatings. The hardened coverings are distinguished by a high gloss, good elasticity and very good weather resistance and colour stability. The products hardenable at room temperature and obtained according to the invention are especially suitable for coating building material, preferably floors, for example those based on cement and concrete.

In addition, the products obtained according to the invention are suitable for use as adhesives, whereby their good solubility, and the resulting high solids content of their solutions, are advantageous.

The following Examples serve to illustrate the invention. In the Examples % signifies percent by weight and T signifies parts by weight.

EXAMPLES

IA. Preparation of a mixed ester

134 T of trimethylolpropane, 98 T of maleic acid anhydride and 240 T of the glycidyl ester of a branched fatty acid with 10 carbon atoms are heated in a reaction vessel to 100° C. with constant stirring and under a protective gas. The temperature is maintained for 1 hour. The mixture is subsequently heated to 150° C. and this temperature is maintained until the acid number of the reaction melt is <15. Cooling is thereafter effected.

The reaction product is a maleic acid mixed ester. When undiluted it has a high viscosity. Solution viscosity: 200 to 300 mPa.s (70% ethylene glycol monoethylether acetate), OH number 350–360, solids content (undiluted) 97.5–98% (1 h/125° C.).

II. Copolymerisation

The mixed polyester IA is polymerised with a monomer mixture according to Examples B to D. The individual components are copolymerised directly according to the comparison Example E which corresponds to the state of the art. The monomers and the quantitative ratio of the reaction materials are shown in the following Table 1.

Polymerisation is effected in two steps according to Examples B to D and in one step only in comparison Example E. The copolymerisation is generally effected under a protective gas. The ratio of the reaction components in the first and second process steps as well as the characteristics of the copolymers (relative to 100% solid) are likewise set out in Table 1.

TABLE 1

| Example | B | C | D | Comparison E |
|---|---|---|---|---|
| Xylene | 400 | 400 | 400 | 400 |
| Ethylene glycol monoethyl-ether acetate | 200 | 200 | 200 | 200 |
| Styrene | 337 | 326 | 326 | 252 |
| Methyl methacrylate 206 | 197 | 188 | 188 | |
| Acrylic acid | — | — | — | 74 |
| Glycidyl ester of branched fatty acid | — | — | — | 240 |
| Hydroxyethyl methacrylate | 84 | 42 | — | 176 |
| Maleic acid mixed ester IA | 311 | 362 | 413 | — |
| Di-tert.-butylperoxide | 9 | 9 | 9 | 9 |
| n-Dodecyl-mercaptan | 10 | 10 | 10 | 10 |
| but divided into two steps as follows: | | | | |
| 1st step mixture 1 | B | C | D | E |
| Maleic acid mixed ester IA | 311 | 362 | 413 | — |
| Styrene | 250 | 250 | 250 | — |
| Di-tert.-butylperoxide | 4.5 | 4.5 | 4.5 | — |
| n-Dodecyl-mercaptan | 5 | 5 | 5 | — |
| 2nd step mixture 2 | | | | |
| Methyl methacrylate | 206 | 197 | 188 | — |
| Hydroxyethyl methacrylate | 84 | 42 | — | — |
| Styrene | 87 | 76 | 76 | — |
| Di-tert.-butylperoxide | 4.5 | 4.5 | 4.5 | — |
| n-Dodecyl-mercaptan | 5 | 5 | 5 | — |
| Characteristics of the copolymers | | | | |
| Acid number | 5 | 7.5 | 7 | 10–12 |
| OH number | 153 | 165 | 154 | 150–155 |
| Viscosity (50 % in ethylene glycol monoethylether acetate) mPa.s | 556 | 410 | 395 | 600–700 |
| Color number | 2 | 2 | 2 | 1–2 |

Examples B to D

After thorough flushing with nitrogen 400 T of xylene and 200 T of ethylene glycol monoethylether acetate are heated to reflux temperature (about 150° C.) in a reaction vessel equipped with a reflux condenser. At this temperature the Mixture 1 (see Table 1) is added dropwise so that the flux temperature of the reaction solution does not fall below 140° C. and the addition of the monomers is ended after about 3½ hours. Immediately subsequent thereto the Mixture 2 together with the remaining monomers is added at the reflux temperature of 140°–145° C., as in step 1, over 3 hours. The reaction is allowed to continue at the reflux temperature for a further 2 hours.

Comparison E

After previous flushing of the apparatus with nitrogen, the solvent mixture and the glycidyl ester of a branched fatty acid are heated to a reaction temperature of 145° C. in a reaction vessel equipped with a reflux condenser. The monomer mixture together with the initiator and the chain controller is thereupon added with constant stirring at such a rate that the temperature of the reaction solution in the reaction vessel does not fall below 138° to 140° C. Generally, the addition of monomer is completed after 6 to 7 hours. Subsequently, polymerisation is continued for about 2 hours at temperatures of 140° to 145° C. until the solids content of the polymer solution is 60.5 to 61.5% (20 minutes/160° C.).

III. Preparation of coating compositions

Coating compositions of the following composition are prepared from the solutions of the copolymers:

| | |
|---|---|
| Copolymer solution | 45 T |
| Dibutyl stannic dilaurate (1% in xylene) | 0.15 T |
| Diethylethanolamine | 0.25 T |
| Silicone oil (1% in xylene) | 1 T |
| Alkyl-aromatic mineral oil (boiling range 160–165° C.) | 5.6 T |
| Xylene | 6.5 T |
| Ethylene glycol monoethyl ether acetate | 9 T |
| Polyisocyanate (75%) (from 3 mol of hexamethylene diisocyanate + 1 mol of H$_2$O) | 18 T |

The isocyanate component is added, with stirring, shortly before the copolymer solution is applied to the substrate. The viscosity of the solution is then adjusted with a mixture of butyl acetate/ethylene glycol monoethylether acetate (volume ratio 1:1) to give an outflow time of 45 seconds (DIN 53211/20° C.) and is applied in a wet layer thickness of 100 μm to glass plates and phosphatised steel sheets. The coating is air dried at room temperature.

IV. Coating test

The results of the coating test can be seen in the following Table 2.

TABLE 2

| Example | B | C | D | Comparison E |
|---|---|---|---|---|
| Dust-free drying time*, minutes | 21 | 24 | 28 | 30 |
| Pendulum hardness, s, after 24 hours | 52 | 55 | 53 | 47 |

TABLE 2-continued

| Example | B | C | D | Comparison E |
|---|---|---|---|---|
| Erichsen cupping after 10 days | >9.0 | >9.2 | >9.2 | 8.1 |
| Resistance to petrol, minutes (after 10 days) | >30 | >30 | >30 | >30 |
| Solids content % (1 h/125° C.) | 53 | 52.5 | 51 | 49.4 |
| Viscosity increase % ready-to-use solution after 7 hours/ 25° C. | 104 | 97 | 102 | 127 |

*A The term dust-free drying time refers to the period of time after which the coating is so dry that no dust adheres thereto anymore.

V. Discussion of the results

As can be seen from Table 2, the dust-free drying time of Examples B to D is improved in relation to the comparison Example E. As a result of the rapid drying and hardening an increased pendulum hardness and an improved Erichsen cupping are also obtained for Examples B to D. The Examples B to D surprisingly show an elevated solids content with the same adjusted outflow time. This points to an elevated solubility in the solvents used or to a lower viscosity of the products. The practical advantage of this property lies in that mixtures with a smaller solvent content, hence environmentally safer systems can be prepared with the products prepared according to the invention at the same viscosity as the comparison sample. Although the products B to D have a relatively rapid dust-free drying time, it is also surprising that the viscosity increase of the samples B to D is small and consequently the processing time is relatively favourable in comparison with sample E.

We claim:

1. In a process for the manufacture of copolymers reacting in a first step an olefinically unsaturated dicarboxylic acid with a polyhydric alcohol to yield a hemiester having free hydroxyl groups, reacting said hemiester in a second step with a monoepoxy compound to yield an olefinically unsaturated diester containing hydroxyl groups and copolymerizing said diester with at least one unsaturated monomer having no free carboxyl groups, the improvement which comprises reacting the hemiester having no ether groups in a second step with an equivalent amount of a monoepoxide compound, based on the hydroxyl groups of the hemi-ester, selected from the group consisting of glycidol, a glycidylether of a phenol and glycidylester of saturated carboxylic acids at a temperature between 100° and 170° C. to yield a reaction product having a molecular weight between 250 and 1500 and an OH-number between 175 and 550 and then copolymerizing the diester having 2 hydroxyalkyl radicals at a temperature between 80° and 220° C. and wherein the hardenable reaction product thus obtained is either isolated or hardened with a hardening agent.

2. A process according to claim 1 wherein the copolymerization is carried out with a monomer mixture containing at least about 50 mol % of at least one aromatic vinyl compound and at most about 20% of hydroxyalkyl esters.

3. A process according to claim 1 wherein the copolymerization is carried out with a monomer mixture containing at least about 50 mol% of at least one aromatic vinyl compound but being free from hydroxy alkyl ester.

4. A process according to claim 1 wherein the copolymerization is carried out at least in part in the presence of a free radical catalyst and in two steps.

5. A process according to claim 1 wherein the copolymerization is carried out at a temperature in the range from 80° to 220° C.

6. A process according to claim 1 wherein the reaction of the hemi-ester in the second stage is carried out at a temperature in the range from about 120° to 155° C. with an equivalent amount of epoxy compound, based on the hydroxyl groups of the diester, to yield a product having a molecular weight from about 400 to 1250 and an OH-number in the range from about 280 to 450 and wherein the copolymerization is carried out at a temperature in the range from 130° to 170° C.

7. A process according to claim 1 wherein the copolymerization is carried out until the solids content of the copolymer is about 60 to 80% by weight.

8. A process according to claim 1 wherein the copolymer is hardened by reaction with a compound selected from the group consisting of free and masked polyisocyanates, polycarboxylic acids and the anhydrides thereof, amino resins and phenolic resins.

9. A process according to claim 8, wherein the hardening is carried out in the presence of a catalyst selected from the group consisting of organometallic compounds, amines and combinations thereof.

10. A binding composition comprising a copolymer prepared by a process as claimed in claim 1 and suitable as a coating or an adhesive composition.

* * * * *

UNITED STATES PATENT AND TRADEMARK OFFICE
CERTIFICATE OF CORRECTION

PATENT NO. : 4,289,866
DATED : September 15, 1981
INVENTOR(S) : JÜRGEN RITZ ET AL.

It is certified that error appears in the above—identified patent and that said Letters Patent is hereby corrected as shown below:

Column 5, line 44 (Table 1): This line should be corrected to read:

-- Methyl methacrylate    206    197    188 --.

Column 6, line 8: "flux" should read -- reflux --.

Signed and Sealed this

Thirteenth Day of April 1982

[SEAL]

Attest:

Attesting Officer

GERALD J. MOSSINGHOFF

Commissioner of Patents and Trademarks